United States Patent
Mejia et al.

(10) Patent No.: US 11,218,071 B2
(45) Date of Patent: Jan. 4, 2022

(54) ISOLATING ELECTRICAL COMPONENTS

(71) Applicant: HEWLETT-PACKARD DEVELOPMENT COMPANY, L.P., Spring, TX (US)

(72) Inventors: Robert G. Mejia, Boise, ID (US);
Nathan Logan, Boise, ID (US);
Bartley Mark Hirst, Boise, ID (US)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 16/607,479

(22) PCT Filed: Apr. 30, 2018

(86) PCT No.: PCT/US2018/030320
§ 371 (c)(1),
(2) Date: Oct. 23, 2019

(87) PCT Pub. No.: WO2019/212525
PCT Pub. Date: Nov. 7, 2019

(65) Prior Publication Data
US 2021/0344269 A1   Nov. 4, 2021

(51) Int. Cl.
*H02M 1/36* (2007.01)
*H02M 1/32* (2007.01)
*H02M 7/06* (2006.01)
*H02M 1/14* (2006.01)

(52) U.S. Cl.
CPC ............ *H02M 1/36* (2013.01); *H02M 1/32* (2013.01); *H02M 1/14* (2013.01); *H02M 7/06* (2013.01)

(58) Field of Classification Search
CPC ............ H02M 1/14; H02M 1/32; H02M 1/36; H02M 7/06
See application file for complete search history.

(56) References Cited

U.S. PATENT DOCUMENTS

| | | | |
|---|---|---|---|
| 5,929,672 A | 7/1999 | Mitani | |
| 6,320,772 B1* | 11/2001 | Doyama | H02M 1/4208 363/89 |
| 6,831,449 B2 | 12/2004 | Nishida et al. | |
| 7,675,196 B2 | 3/2010 | Kimura | |
| 8,058,910 B1 | 11/2011 | Wright | |
| 8,242,817 B2 | 8/2012 | Yamamoto et al. | |
| 8,466,664 B2 | 6/2013 | Tanzawa | |
| 8,599,589 B2 | 12/2013 | Lum | |
| 8,693,048 B2 | 4/2014 | Yazdy | |

(Continued)

*Primary Examiner* — Jue Zhang
(74) *Attorney, Agent, or Firm* — Brooks Cameron & Huebsch PLLP

(57) ABSTRACT

An example system includes a rectifying component to convert an alternating current (AC) signal into a direct current (DC) signal. The system also includes a filtering component. The filtering component determines that a plurality of AC cycle drops have occurred and will deactivate the AC signal in response to that determination. Furthermore, the system includes an isolating component. The isolating component consumes greater than a threshold level of power in one state and less than a threshold level of power in another state. The isolating component is operating in the state that consumes greater than a threshold level of power when the signal that indicates the AC voltage is at a level in which it may allow the device to operate safely and properly is deactivated.

15 Claims, 4 Drawing Sheets

(56) References Cited

U.S. PATENT DOCUMENTS

| | | |
|---|---|---|
| 9,136,777 B2 | 9/2015 | Ettes et al. |
| 2012/0113685 A1* | 5/2012 | Inukai .................... G03G 15/80 |
| | | 363/21.01 |
| 2013/0111243 A1 | 5/2013 | Barnette et al. |
| 2015/0089254 A1 | 3/2015 | Burns et al. |
| 2015/0143154 A1 | 5/2015 | Haussermann et al. |
| 2016/0091849 A1* | 3/2016 | Nishida ................... H02M 1/32 |
| | | 399/70 |

* cited by examiner

ISOLATING ELECTRICAL COMPONENTS

BACKGROUND

Mains electricity may refer to a general-purpose alternating current (AC) electric power supplied from a power station. For example, mains electricity may be a form of electrical power that is delivered to homes and businesses. Some devices may try to draw power from a power supply even when there is insufficient power to power the device. Circuits that signal whether the AC power is sufficient to safely power the device allow devices to avoid this situation. These circuits increase their usefulness when the power required to power them decreases.

DETAILED DESCRIPTION

Figure 1:
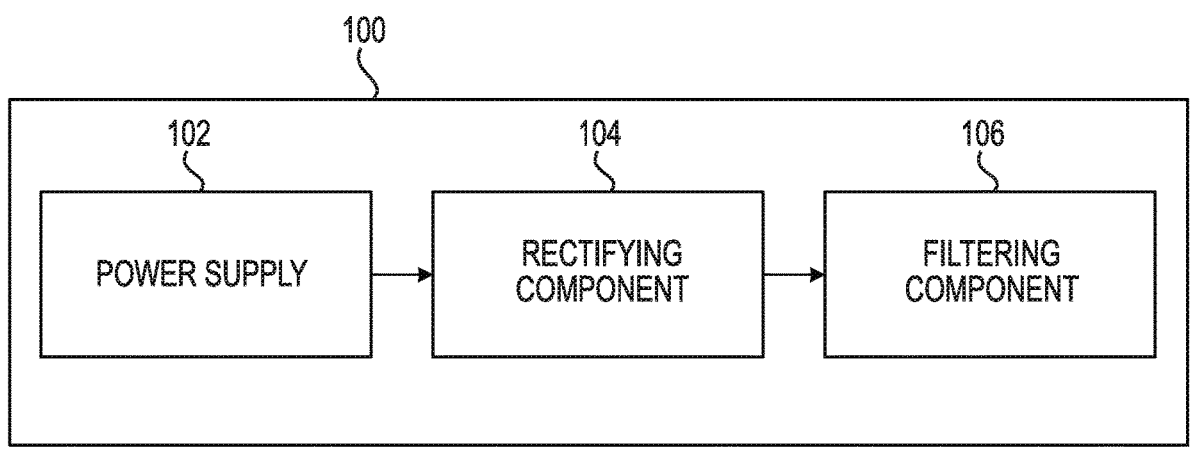
FIG. 1 illustrates an example of a system for isolating electrical components.

Insufficient power to a device may cause a variety of problems for electronic components inside the device. When an electrical component does not have sufficient voltage, the electrical component may draw more current. This increase in current may damage the electrical component because of an increase in heat. The increased heat may cause the electrical component to overheat and sustain damage. The damage may depend on the magnitude and/or duration of the overheating.

Circuits that indicate when an input voltage is within a range that allows the device to operate safely can help prevent the damage and/or improper operation caused by insufficient voltage. These circuits may use transformers to isolate electrical components. A transformer may continuously consume power whether a device is in sleep mode or active mode. This may cause a transformer to consume more energy than necessary to function as an isolator. The energy consumption combined with the physical size of a transformer may increase the cost of building a circuit to signal when AC power is in a range that allows a device to operate safely. In contrast, a circuit that outputs a signal that indicates the AC power is within a range that allows a device to operate safely. Such circuits may be more energy and cost effective than some approaches that use transformers.

As used herein, the term "safely" can, for example, refer to how an electrical component or device operates. Devices may be designed to operate at a specified voltage. Devices may have a range in which, even if their input voltage is not the specified voltage they were designed to operate with, the device can still operate safely. A device may be operating safely if the voltage that is powering its operation is not also damaging it. If the device receives voltage outside of the range where it can operate safely, the voltage may cause damage to the device.

As used herein, the term "improper operation" can, for example, refer to a device functioning in a manner that is inconsistent with how the device was designed to operate. When an electrical device is not functioning as intended, this is an indication of improper operation or system corruption. For example, an electrical device, such as a laser printer, is not operating properly if the toner does not properly adhere to the page during printing.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the disclosure. In addition, the proportion and the relative scale of the elements provided in the figures are intended to illustrate the examples of the disclosure and should not be taken in a limiting sense.

FIG. 1 illustrates an example of a system for setting conditions for isolating an electrical component. The system can include a device. As used herein, the term "device" can, for example, refer to a piece of mechanical or electronic equipment that is made or adapted for a particular purpose. In some examples, the device can be a printer.

As shown in FIG. 1, the system may include a power supply 102, a rectifying component 104, and a filtering component 106. The electrical components in the system may be arranged such that power consumption is minimized when the AC voltage is at a level in which it can safely and properly power the system. This minimizes power consumption when the device is operating in a manner that is consistent with how the device was designed to operate. The system may include a device 100, a power supply 102 supplies AC voltage to the device. As used herein, the term "power supply" can, for example, refer to a device that supplies electric power to an electrical load. In some examples, the power supply 102 may be a direct current (DC) power supply that supplies a constant DC voltage to the electrical components of the device 100 (e.g., a server, an apparatus, etc.). An example of a power supply is a Hewlett Packard Enterprise (HPE) 2900-3400 W Hot Plug Platinum power supply however, examples are not limited to specific protocols, brands, and/or model numbers of power supplies, and the power supply 102 may be any suitable power supply that provides communication between the power supply 102 itself and the rectifying component 104.

As used herein, the term "rectifying component" can, for example, refer to a circuit that converts an alternating current (AC) into a direct current (DC) by allowing a current to flow through it in one direction. This process may be referred to as rectification. The rectifying component 104 may convert the AC voltage supplied by the power supply 102 into DC voltage. Rectifying components may include single-phase rectifiers and three phase rectifiers.

Single-phase rectifiers may be used for power supplies for domestic equipment. Single-phase rectifiers may also be further classified as half-wave rectifiers or full-wave rectifiers. In half-wave rectifiers, the rectifier may allow either the positive or negative half of the AC wave to pass while blocking the other half. Half-wave rectification may use a single diode in a single-phase supply, or a plurality (e.g. 3 or more) of diodes in a three-phase supply.

As used herein, the term "single-phase supply" can, for example, refer to the distribution of AC voltage using a system in which the voltages vary in unison. Single-phase supplies may be used when loads are mostly lighting and heating. Individual residences and small commercial buildings may use single-phase distribution. Rural areas where motor loads are small and uncommon may also use single-phase distribution.

As used herein, the term "three-phase supply" can, for example, refer to a system of distributing AC voltage that may be used by electrical grids to transfer power. Three-phase supplies may be used to transfer power to large businesses and/or high-density areas. Three-phase supplies may be more efficient at transferring energy than single-phase supplies because three-phase supplies may use less conductor material to transmit a given amount of voltage.

A full-wave rectifier may convert the whole of the input waveform to one of constant polarity at its output. Full-wave rectification may convert both polarities of the input waveform to pulsating direct current. In some examples, two diodes and a center tapped transformer, or four diodes in a bridge configuration and any AC source may be used in a full-wave rectifier.

Three-phase rectifiers may be used in industrial and/or high-power electrical equipment. As with single-phase rectifiers, three-phase rectifiers may be half-wave circuits, full-wave circuits using center-tapped transformers, or full-wave bridge circuits. Three-phase half-wave circuits may use three diodes, one connected to each phase. Three-phase, full-wave circuits using center-tapped transformers may use six diodes, one connected to each end of each transformer secondary winding. Three-phase bridge rectifiers may also use six diodes.

As used herein, the term "filtering component" can, for example, refer to a circuit that performs signal processing functions, specifically to remove unwanted frequency components from the signal, to enhance wanted ones, or both. The filtering component 106 may average out the ripple in the rectified voltage. In some examples, the filtering component 106 may include two resistors and a capacitor. The filtering component may be a passive filter or an active filter. Passive filters may be based on combinations of resistors, inductors, and capacitors. They are known as passive filters because they may not depend upon an external power supply and/or they may not contain active components such as transistors.

As used herein, an "electrical component" can, for example, refer to an electrical circuit (e.g., circuitry), hardware device (e.g., one or more processing resources and/or one or more memory resources), logic device, application-specific integrated circuit, field-programmable gate array, or combinations thereof, to perform one or more tasks or functions. For example, an electrical component can be a non-volatile dual in-line memory module (NV-DIMM), a graphics processing unit (GPU), a sound card, and a variety of other electrical circuits and devices.

A NV-DIMM can be a type of random access memory from computers. Non-volatile memory can be memory that retains its contents even when electrical power is removed, for example from an unexpected power loss, system crash, or normal shutdown. Dual in-line may identify the memory as using the DIMM package. NV-DIMMs may improve application performance, data security, and system crash recovery time.

A GPU can be a specialized electronic circuit designed to rapidly manipulate and alter memory to accelerate the creation of images in a frame buffer intended for output to a display device. GPUs may be used in embedded systems, mobile phones, personal computers, workstations, and game consoles. In personal computers, the GPU may be present on a video card or it can be embedded on a motherboard.

A sound card can be an internal expansion card that provides input and output of audio signals to and from a computer under the control of computer programs. A sound card can also be an external audio interface used for professional audio applications. Sound cards may be used to provide the audio component for multimedia applications such as music composition, editing video or audio, presentation, education and entertainment, and/or video projection.

Figure 2:
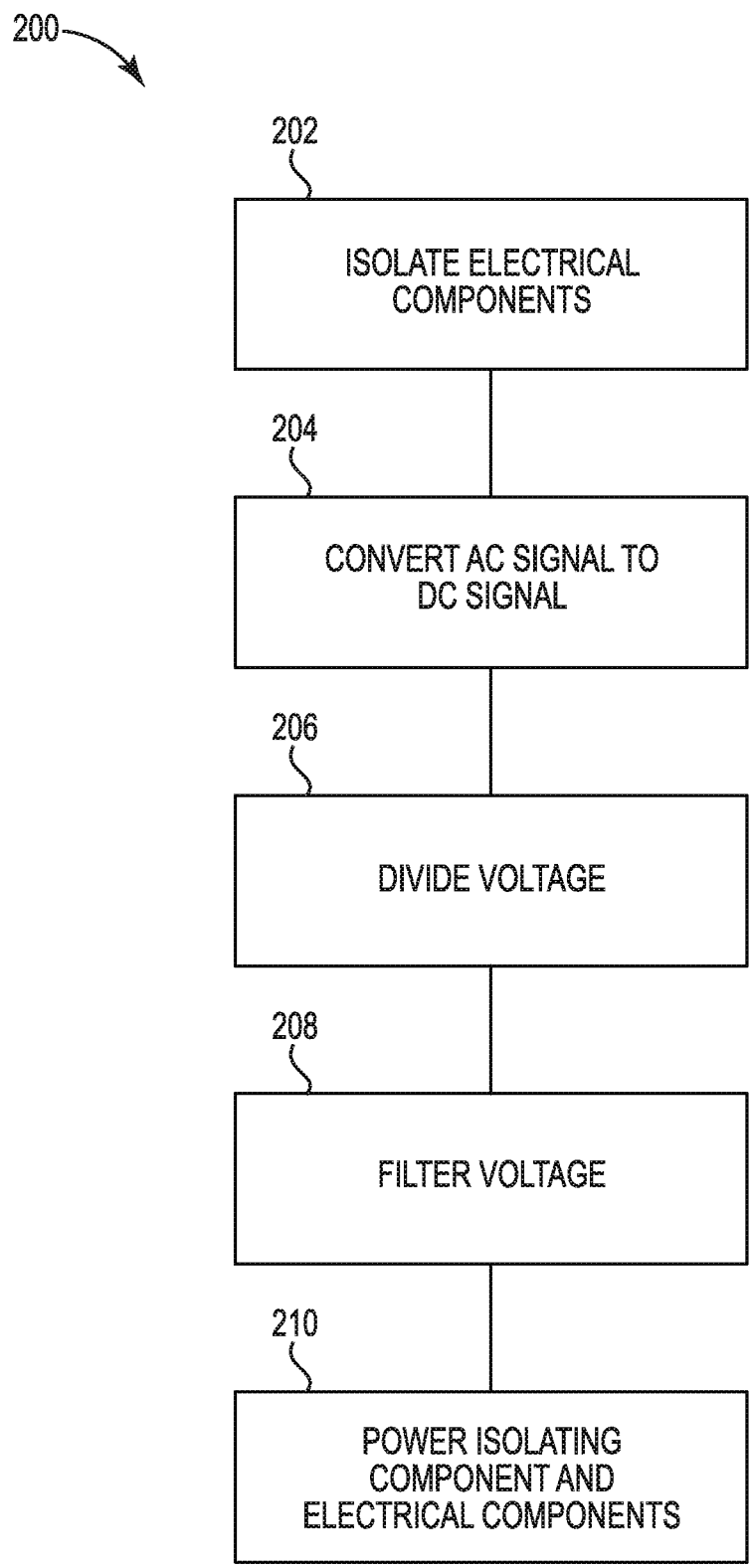
FIG. 2 illustrates an example of a method for isolating electrical components.

FIG. 2 illustrates an example of a flow diagram of a method for isolating electrical components. At block 202, the method may include isolating electrical components. For example, the method may include using an isolating component to isolate electrical components that consume higher than a threshold level of power from electrical components that consume lower than a threshold level of power. In some examples, the electrical components that consume higher than a threshold of power may receive power from the power supply (e.g., power supply 102 illustrated in FIG. 1, herein) when the AC power is such that it may not allow the device to operate safely. Furthermore, in some examples, the power supply may not power the electrical components that consume higher than a threshold level of power when the AC power is such that it may allow the device to operate safely.

At block 204, the method may include converting an AC signal to a DC signal. For example, a rectifying component (e.g., rectifying component 104 illustrated in FIG. 1, herein) may convert an AC signal to a DC signal. The rectifying component may convert an AC signal to a DC signal by restricting the current that runs through it to one direction. Homes and businesses may be wired for AC voltage because electrical energy is distributed as AC voltage. This may be because AC voltage may be increased or decreased with a transformer and, therefore, AC power can be transmitted through power lines efficiently at high voltage. The AC power may also be transformed to a lower and safer voltage for use.

Although most homes and businesses may be wired to accept AC voltage, most devices may run on DC voltage. Devices that run off a battery, plug into the wall with an AC adapter, or use a USB cable for power may rely on DC voltage. Some examples of devices that may run on DC voltage include cellphones, televisions, and laptop computers. Converting AC voltage to DC voltage may be useful because, although AC voltage may be transmitted through powerlines into most homes and businesses, most devices may be powered by DC voltage.

A used herein, the term "transformer" can, for example, refer to an electrical device that may transfer electrical energy between two or more circuits through electromagnetic induction. A varying current in one coil of the transformer may produce a varying magnetic field, which in turn may induce a varying voltage in a second coil. Power can be transferred between the two coils without a metallic connection between them.

At block 206, the method may include dividing a voltage. For example, a voltage divider may be used to divide the voltage. The voltage divider may be created by connecting two resistors in series. The output voltage may be divided between the two resistors based on the resistance of each resistor. In some examples, the voltage divider may divide the rectified voltage down to one-third of its value; however, examples are not so limited, and the ratio may be adjustable based on the system constraints.

At block 208, the method may include filtering a voltage. For example, a filtering component (e.g., filtering component 106 illustrated in FIG. 1, herein) may filter the voltage. The filtering component may average out the ripple in the rectified voltage. The filtering component may include two resistors and a capacitor. The filtering component may be a passive filter or an active filter. Passive filters may be based on combinations of resistors, inductors, and/or capacitors. Passive filters may not depend upon an external power supply and/or they may not contain active components such as transistors. The filtering component may also determine whether a plurality (e.g. more than two) AC cycles are missing. If a plurality of AC cycles are missing, the filtering component may deactivate the AC signal in response to that determination.

At block 210, the method may include powering an isolating component and electrical components. For example, an isolating component may be used to isolate electrical components that consume higher than a threshold level of power from electrical components that consume lower than a threshold level of power. In some examples, the electrical components that consume higher than a threshold level of power may receive power from the power supply (e.g., power supply 102 illustrated in FIG. 1, herein) when the AC power is such that it may not allow the device to operate safely and/or properly. Furthermore, in some examples, the power supply may not power the isolating component and electrical components that consume higher than a threshold level of power when the AC power is such that it may allow the device to operate safely and/or properly. However, the isolating component and the electrical components that consume higher than a threshold level of power may be powered on when the filtering component deactivates the signal that indicates that the AC power is at a level that may allow the device to operate safely and/or properly.

As used herein, the term "isolating component" can, for example, refer to an electrical component that can galvanically isolate other electrical components. Galvanic isolation involves isolating functional sections of an electrical system to prevent current flow. Energy or information may still be exchanged between the sections by other means such as capacitance, induction, optical, acoustic, or mechanical means.

Figure 3:
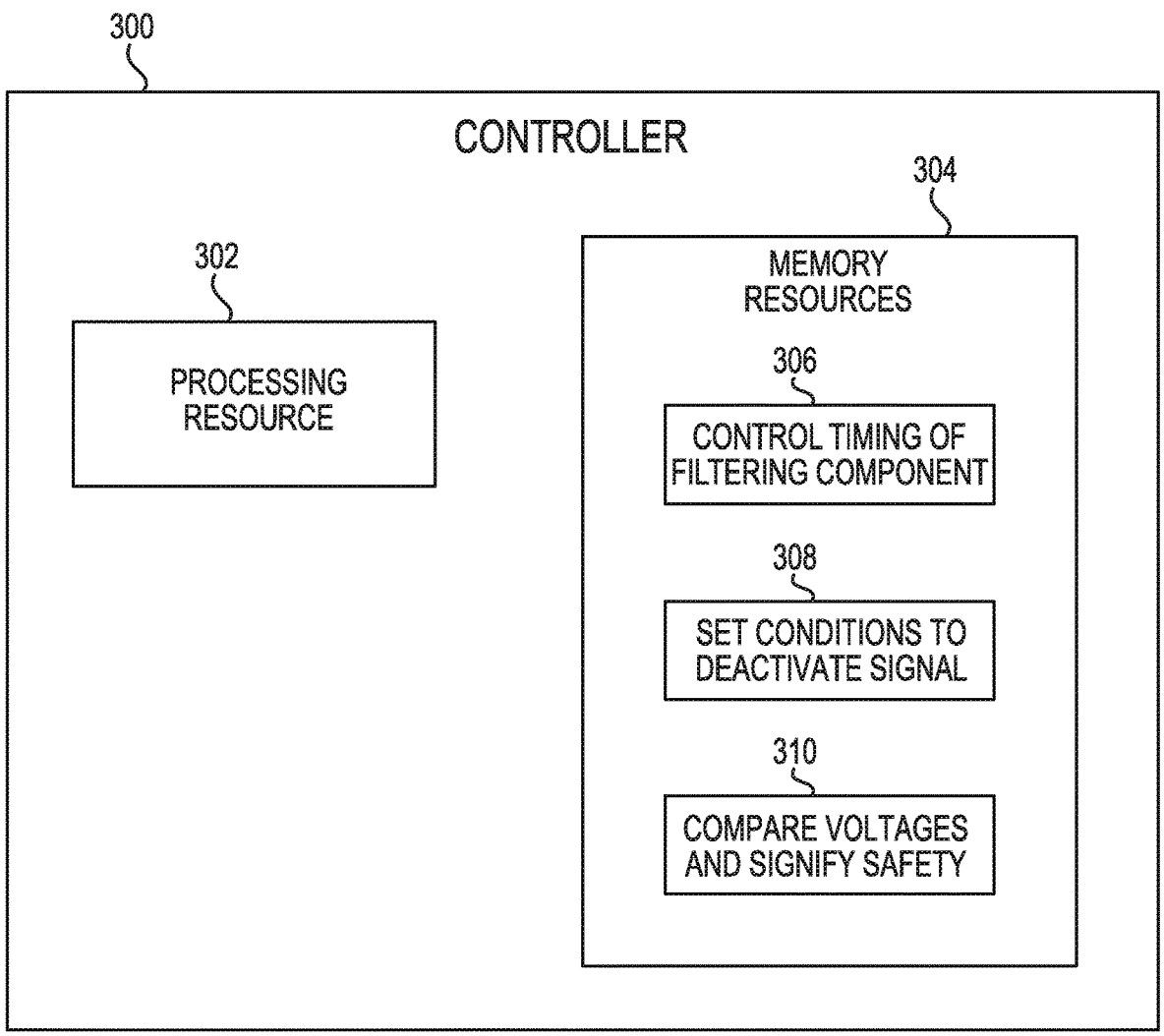
FIG. 3 illustrates an example of an apparatus for isolating electrical components.

FIG. 3 illustrates an example of an apparatus for isolating electrical components. The controller 300 includes a processing resource 302 and a memory resource 304. The processing resource 302 may read the instructions stored in memory resource 304 and execute those instructions. Based on the instructions stored in the memory resource 304, the processing resource may control the timing of a filtering component (e.g., filtering component 106 illustrated in FIG. 1, herein). The processing resource 302 may also set the conditions that may cause the processing resource 302 to deactivate a signal that indicates the AC power is at a level that allows the device to operate safely, compare the filtered voltage to the reference voltage, and/or signify whether the AC voltage is at a level that allows the device to operate safely.

As used herein, the term "processing resource" can, for example, refer to an electronic circuit which performs operations on some external data source, usually memory or some other data stream. The processing resource 302 may execute instructions stored on the memory resource 304. The memory resource 304 may contain instructions which instruct the processing resource 302 to generate a signal to indicate whether the AC voltage is at a level that allows the device to operate safely.

As used herein, the term "memory resource" can, for example, refer to an integrated circuit that stores information for immediate use in a computer. In some examples, the memory resource 304 may include ferroelectric RAM, NOR flash, programmable read-only memory (e.g., FPROM, EEPROM, OTP NVM, etc.) and/or RAM, among other volatile and/or non-volatile memory resources. The memory resource 304 may store instructions for the processing resource 302 to execute.

The controller 300 may control the timing of the filtering component. The filtering component may respond at a speed that allows the filtering component to be useful as an early warning for power failure within the system. However, the filtering component may also respond at a speed that allows the AC current to miss two cycles without causing the processing resource 302 to deactivate the signal that indicates the AC power is at a level that allows the device to operate safely. For example, the filtering component may also respond at a speed that allows the AC current signal received by the filtering component to miss two cycles without causing the processing resource 302 to deactivate the signal that indicates the AC power is at a level that allows the device to operate safely. This may allow for a decrease in the instances where voltage transients that would not damage, or result in improper operation of the system, cause the processing resource 302 to deactivate the signal that indicates that the AC power is at a level that allows the device to operate safely.

As used herein, the term "voltage transient," can, for example, refer to a momentary burst of energy caused be a sudden change of state. The source of the transient energy may be an internal event or an external event. Examples of voltage transients can include momentary variations in current, voltage, and/or frequency, etc. Some examples of external events that may cause voltage transients may include lightning strikes, power outages, tripped circuit breakers, and short circuits.

Figure 4:
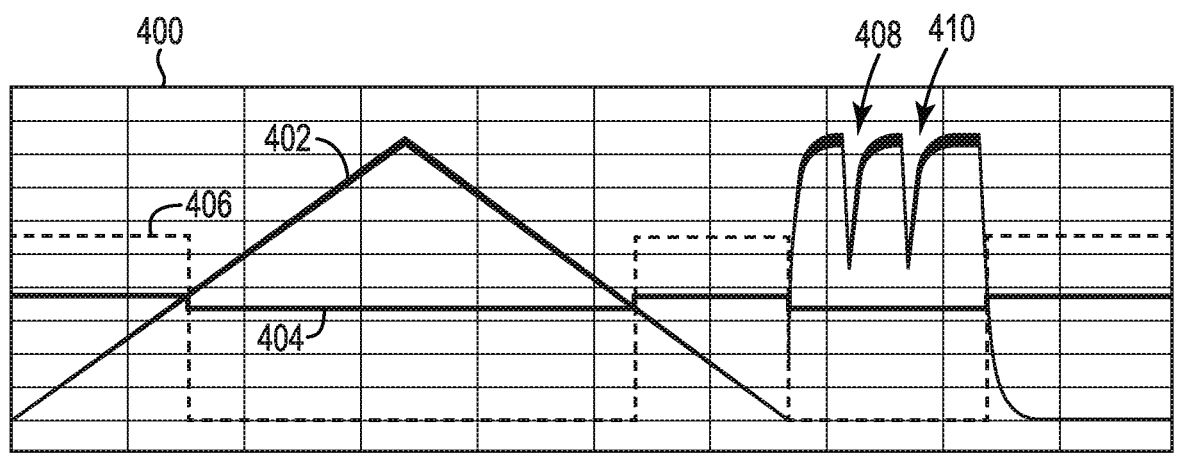
FIG. 4 illustrates an example of a line graph for isolating electrical components.

FIG. 4 illustrates an example of a line graph for setting conditions for isolating an electrical component. The oscillating line 402 represents the filtered voltage. The filtered voltage may rise and fall with the envelope of the AC voltage. FIG. 4 illustrates two instances where the filtered voltage may miss two cycles at, for example 408 and/or 410 without decreasing its value to the value of the positive input of the comparator. For example, within a first period of time, the filtered voltage may miss two cycles as shown at 408. Subsequently, within a second period of time, the filtered voltage may miss two cycles, as shown at 410. Therefore, the signal that indicates the AC voltage is at a level where the device can operate safely may not be deactivated.

As used herein, the term "envelope" can, for example, refer to the curve outlining the extremes of an oscillating signal. The envelope of a wave may be further described as including an upper envelope and a lower envelope. The upper envelope may be a curve that represents the highest amplitude of each cycle of the wave and the lower envelope may be a curve that represents the lowest amplitude of each cycle of the wave.

The solid line 404 represents the positive input of the comparator. The comparator may compare its voltage to the filtered voltage. When the filtered voltage exceeds the positive input of the comparator, the AC voltage may be at a level in which it may allow the device to operate safely.

The dashed line 406 represents the comparator output. A voltage reference and/or voltage divider may be used to create a reference to compare the filtered voltage against. This reference may set the value that discerns an AC input voltage that may allow a device to operate safely properly from an AC input voltage that may not allow the device to operate safely and properly. The comparator may detect each time the rectified and filtered signal crosses the threshold voltage applied to the negative input of the comparator. The state of the comparator output may indicate whether the AC voltage is sufficient for a device to operate safely. If the comparator output is low, the AC voltage may be high and therefore may allow the device to operate safely. If the comparator output is high, the AC voltage may be low and therefore may not allow the device to operate safely.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure. As used herein, designators such as "N", etc., particularly with respect to reference numerals in the drawings, indicate that a number of the particular feature so designated can be included. A "plurality of" is intended to refer to more than one of such things.

What is claimed:

1. A system, comprising:
    a rectifying component to convert an alternating current (AC) signal into a direct current (DC) signal;
    a filtering component to:
        determine that a plurality of AC cycle drops have occurred; and
        deactivate a signal that indicates that an AC power is at a level that allows a device to operate properly; and
    an isolating component that consumes greater than a threshold level of power in one state and consumes less than the threshold level of power in another state, wherein the isolating component is operating in the state that consumes greater than the threshold level of power when the signal that indicates the AC power is at a level that allows the device to operate properly is deactivated.

2. The system of claim 1, wherein the rectifying component includes at least one capacitor and at least one resistor.

3. The system of claim 1, wherein the filtering component does not transmit a signal to deactivate the AC signal until the filtering component determines that at least two consecutive AC cycle drops have occurred.

4. The system of claim 1, wherein the isolating component is galvanically isolated from an AC supply.

5. The system of claim 1, wherein the system further comprises a voltage divider coupled to the rectifying component, and wherein the voltage divider divides a rectified voltage down to ⅓ of its value.

6. The system of claim 1, wherein the rectifying component includes at least one diode.

7. A method, comprising:
    isolating, using an isolating component, electrical components that consume greater than a threshold level of power from electrical components that consume less than a threshold level of power;
    converting an alternating current (AC) signal to a direct current (DC) signal;
    dividing a voltage, using a voltage divider that is coupled to a rectifying component;
    filtering the voltage and comparing the filtered voltage to a reference voltage; and
    powering on the isolating component and the electrical components that consume greater than the threshold level of power when the filtered voltage is lower than the reference voltage.

8. The method of claim 7, further comprising using the rectifying component to convert the AC signal to the DC signal.

9. The method of claim 7, wherein dividing the voltage further comprises dividing, using the rectifying component, the voltage to a magnitude substantially equal to ⅓ of a magnitude of the voltage prior to the voltage being divided.

10. The method of claim 7, further comprising:
    determining, using a filtering component, that a plurality of AC drops have occurred; and
    deactivating, using the filtering component, the AC signal in response to the determination.

11. The method of claim 7, further comprising powering on the isolating component and powering the electrical components that consume greater than a threshold level of power when a signal that indicates the AC power is of a value that can properly power a system is deactivated.

12. An apparatus, comprising:
    a controller, including a processing resource coupled to a memory resource, the processing resource to execute instructions stored on the memory resource to cause the processing resource to:
        control a timing of a filtering component;
        set conditions that will deactivate a signal that indicates an alternate current (AC) power is of a value that can properly power a system;
        compare a filtered voltage to a reference voltage; and
        signify that the AC power is of the value that can properly power the system when the filtered voltage is higher than the reference voltage.

13. The apparatus of claim 12, wherein the filtering component responds to two consecutive missed AC cycles at a speed that allows an AC signal received by the filtering component to miss two cycles without deactivating the signal that indicates that the AC power is of the value that can properly power the system.

14. The apparatus of claim 12, wherein the processing resource is to execute instructions stored on the memory resource to cause the processing resource to cause the signal that indicates the AC power is of a value that can properly power the system to be deactivated when the filtered voltage is lower than the reference voltage.

15. The apparatus of claim 12, wherein the processing resource is to execute instructions stored on the memory resource to cause the processing resource to convert an AC current signal to a direct current (DC) signal.

* * * * *